(12) United States Patent
Machala et al.

(10) Patent No.: US 6,504,472 B2
(45) Date of Patent: Jan. 7, 2003

(54) APPARATUS AND METHOD FOR ELECTRONICALLY DELAYING OR STOPPING VEHICLES

(76) Inventors: Michael Martin Machala, 951 S. Idaho St., #65, La Habra, CA (US) 90631; Richard Anthony Governali, 2136 N. Rosewood Ave., Santa Ana, CA (US) 92706-1916

(*) Notice: Subject to any disclaimer, the term of this patent is extended or adjusted under 35 U.S.C. 154(b) by 0 days.

(21) Appl. No.: 10/072,750

(22) Filed: Feb. 5, 2002

(65) Prior Publication Data

US 2002/0070850 A1 Jun. 13, 2002

Related U.S. Application Data

(63) Continuation-in-part of application No. 09/247,426, filed on Feb. 10, 1999.

(51) Int. Cl.[7] ............................................. B60R 25/10
(52) U.S. Cl. .................. 340/426; 340/425.5; 340/539; 307/10.2; 307/10.3; 116/33
(58) Field of Search .......................... 340/426, 425.5, 340/539, 825.37, 825.69; 307/10.2, 10.3; 116/33, 202

(56) References Cited

U.S. PATENT DOCUMENTS

| | | | |
|---|---|---|---|
| 3,703,714 A | 11/1972 | Andrews | 340/426 |
| 4,067,411 A | 1/1978 | Conley et al. | 180/114 |
| 4,619,231 A * | 10/1986 | Stolar et al. | 123/333 |
| 4,651,157 A | 3/1987 | Gray et al. | 342/457 |
| 4,660,528 A * | 4/1987 | Buck | 123/333 |
| 4,665,379 A | 5/1987 | Howell et al. | 340/426 |
| 4,794,368 A | 12/1988 | Grossheim et al. | 340/527 |
| 4,797,671 A | 1/1989 | Toal, Jr. | 340/825.49 |
| 4,884,055 A | 11/1989 | Memmola | 340/426 |
| 4,910,493 A | 3/1990 | Chambers et al. | 340/426 |
| 4,947,151 A | 8/1990 | Rosenberger | 340/426 |
| 4,990,890 A | 2/1991 | Newby | 340/539 |
| 5,117,217 A | 5/1992 | Nykerk | 340/426 |
| 5,129,376 A | 7/1992 | Parmley | 123/179.2 |
| 5,146,215 A * | 9/1992 | Drori | 340/825.32 |
| 5,172,094 A | 12/1992 | Stadler | 340/426 |
| 5,276,728 A * | 1/1994 | Pagliaroli et al. | 379/58 |
| 5,307,048 A * | 4/1994 | Sonders | 340/426 |
| 5,408,211 A | 4/1995 | Hall | 340/426 |
| 5,453,730 A * | 9/1995 | De-Grinis et al. | 340/426 |
| 5,477,206 A | 12/1995 | Rodriguez, Sr. | 340/430 |
| 5,535,844 A | 7/1996 | Samford | 180/287 |
| 5,563,577 A | 10/1996 | Adkins | 340/468 |
| 5,604,384 A * | 2/1997 | Carlo et al. | 307/10.5 |
| 5,719,551 A | 2/1998 | Flick | 340/426 |
| 5,729,191 A * | 3/1998 | Allen et al. | 340/426 |
| 5,729,192 A * | 3/1998 | Badger | 340/426 |
| 5,742,227 A | 4/1998 | Escareno et al. | 340/426 |
| 5,805,057 A | 9/1998 | Eslaminovin | 340/426 |
| 5,812,051 A * | 9/1998 | Talbot et al. | 340/426 |
| 5,819,869 A | 10/1998 | Horton | 180/287 |
| 5,838,227 A * | 11/1998 | Murray | 340/425.5 |
| 5,850,173 A * | 12/1998 | DiCroce et al. | 340/426 |
| 5,861,799 A * | 1/1999 | Szwed | 340/425.5 |
| 5,925,940 A * | 7/1999 | Donatelle et al. | 307/10.2 |
| 5,933,075 A * | 8/1999 | Ditson | 340/426 |
| 5,977,654 A * | 11/1999 | Johnson et al. | 307/10.3 |
| 6,028,505 A * | 2/2000 | Drori | 340/426 |
| 6,072,248 A * | 6/2000 | Muise et al. | 307/10.2 |
| 6,124,805 A | 9/2000 | Gabbard | 340/825.72 |
| 6,232,884 B1 | 5/2001 | Gabbard | 340/825.72 |
| 6,320,498 B1 * | 11/2001 | Flick | 340/426 |
| 6,320,514 B1 * | 11/2001 | Flick | 340/825.69 |
| 6,411,887 B1 * | 6/2002 | Martens et al. | 701/115 |

FOREIGN PATENT DOCUMENTS

WO    WO 98 30421    7/1998

\* cited by examiner

Primary Examiner—Toan N Pham
(74) Attorney, Agent, or Firm—Blakely Sokoloff Taylor & Zafman

(57) ABSTRACT

The invention relates to a mechanism for electronically disabling a motor vehicle. More specifically, the invention relates to a transmitter that is aimed by law enforcement personnel at a receiver attached to a motor vehicle driven by a suspect. The transmitter emits signals that cause the receiver to trigger a relay to open thereby terminating the power to the ignition coil (or to a microprocessor) and shutting off the engine of the suspect's motor vehicle.

7 Claims, 4 Drawing Sheets

APPARATUS AND METHOD FOR ELECTRONICALLY DELAYING OR STOPPING VEHICLES

The present application is a continuation-in-part of U.S. patent application Ser. No. 09/247,426 filed Feb. 10, 1999.

BACKGROUND OF THE INVENTION (1) Field of the Invention

The invention relates to a mechanism for electronically disabling a motor vehicle. More specifically, the invention relates to a transmitter that is aimed by law enforcement personnel at a receiver attached to a motor vehicle driven by a suspect. The transmitter emits signals that cause the receiver to trigger a relay to open thereby terminating the power to the ignition coil and shutting off the engine of the suspect's motor vehicle.

(2) Related Art

Traditional methods used by law enforcement personnel to stop fleeing suspects are inherently dangerous and may take a considerable amount of time to implement. For example, law enforcement personnel may stop fleeing suspects by: blocking the path of the suspect's motor vehicle; causing the suspect's motor vehicle to crash; waiting for the suspect's motor vehicle to run out of gas; using gunfire or puncture devices to flatten tires of the suspect's motor vehicle; or, using a rocket-driven remote-controlled car launched and guided under the suspect's motor vehicle where an electronic disrupter is detonated.

There are obvious disadvantages to these traditional methods. Serious bodily injury may occur to the person who is fleeing, to innocent bystanders, or to the law enforcement personnel. Property damage also may result from the traditional methods used by law enforcement personnel. In view of the forgoing, it would be desirable to have a device that can quickly, easily, and cheaply stop a suspect's motor vehicle.

BRIEF SUMMARY OF THE INVENTION

The chase stopper comprises a device that is useful in quickly stopping a motor vehicle trying to evade law enforcement personnel. Specifically, a receiver is coupled to a motor vehicle driven by a suspect and a transmitter is coupled to a motor vehicle operated by an employee of law enforcement or is held by that individual. The transmitter emits a first signal to the receiver coupled to the suspect's motor vehicle. This causes the brake lights to the suspect's motor vehicle to begin to flash. The flashing of the brake lights shows law enforcement personnel that the suspect's motor vehicle is equipped with a receiver and the receiver is operational. Law enforcement personnel can then send a second signal to the receiver. The second signal to the receiver disables the suspect's motor vehicle by causing a relay to the engine in the suspect's motor vehicle to open thereby terminating the power to the ignition coil and shutting off the engine. Alternatively, a relay may be coupled to a microprocessor to the car and the power may be similarly shut off to the microprocessor that causes the motor vehicle to shut down. By quickly stopping the suspect's vehicle, the threat of bodily injury and property damage is minimized. In addition, the invention can be manufactured at low cost (viz., approximately $10 per receiver).

BRIEF DESCRIPTION OF THE DRAWINGS

The present invention is illustrated by way of example. The invention is not limited to the figures of the accompanying drawings in which like references indicate similar elements. Other aspects and methods of the present invention are described below in conjunction with the FIGS.

FIGS. 2, 3a and 3b are schematic diagrams showing the operation of two embodiments of the invention.

DETAILED DESCRIPTION OF THE INVENTION

The following description and drawings are illustrative of the invention and are not to be construed as limiting the invention.

Figure 1:
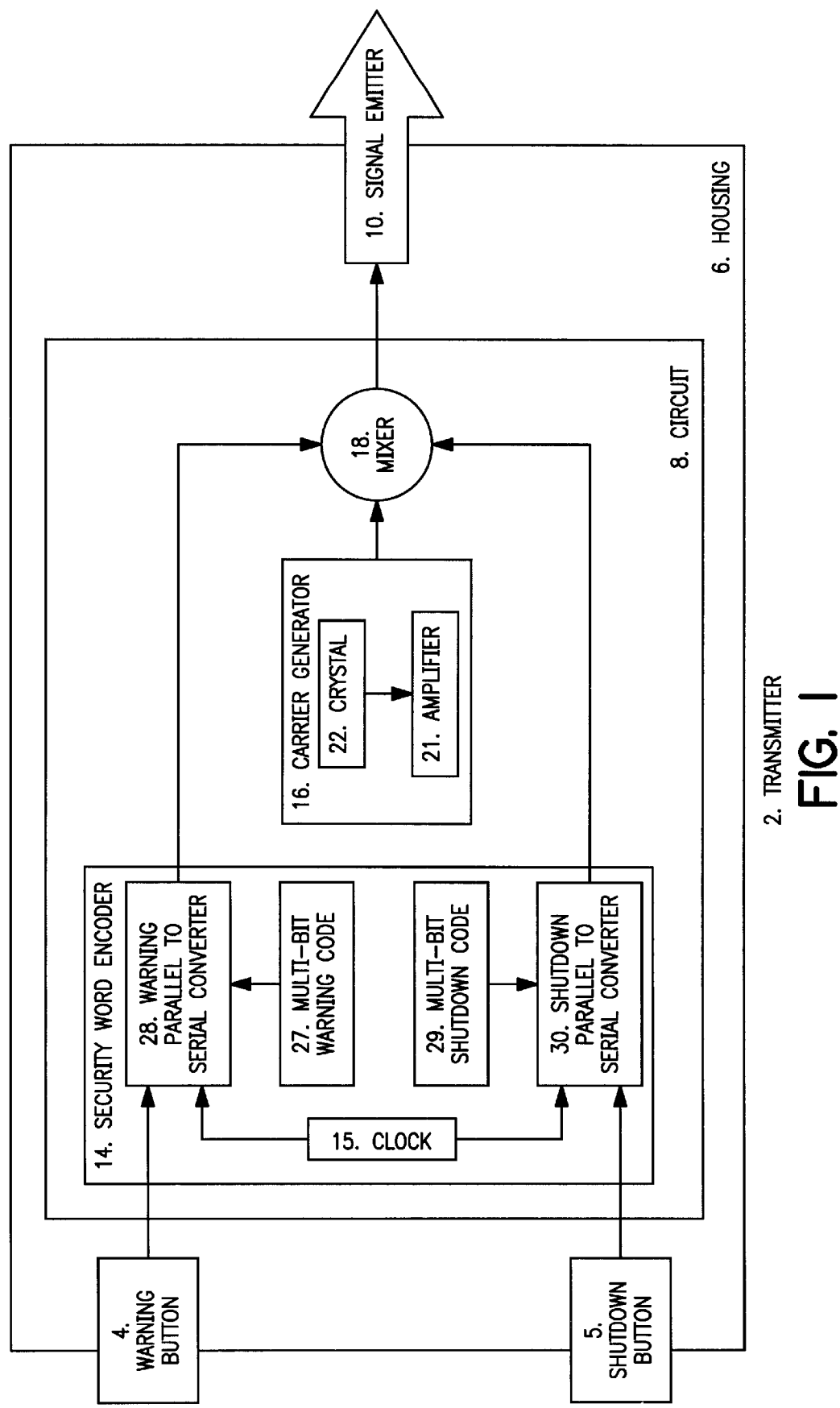
FIG. 1 is a schematic diagram showing the operation of the transmitter.

FIG. 1 is a schematic diagram showing a transmitter 2. A transmitter 2 may be comprised of a warning button switch 4, a shut down button switch 5, a housing 6, a circuit 8, and a signal emitter 10. The circuit 8 is comprised of the security word encoder 14, a clock 15, a warning parallel to serial converter 28, a shutdown parallel to serial converter 30, a carrier generator 16, and a mixer 18. The carrier generator 16 is comprised of a crystal 22 and an amplifier 21.

The law enforcement officer presses the warning button switch 4 causing a first signal to be sent to the receiver 40. The shut down button switch 5 is then pressed and a second signal is emitted from the transmitter 2 to the receiver 40.

The transmitter 2 may also include security measures such as a security code that prevents use of the transmitter 2 by individuals not authorized to use it. For example, for the transmitter to become operational, a security code may be required. The security of the chase stopper may be enhanced with the use of multiple frequencies of transmission and encoded multi-bit data encryption/decryption schemes. The multi-bit may be four (4) to one hundred and twenty eight (128) bits or more, depending upon the level of security required by the government agency. The type of security chosen mandated by a government agency or commission may affect the cost of the chase stopper.

Figure 2:
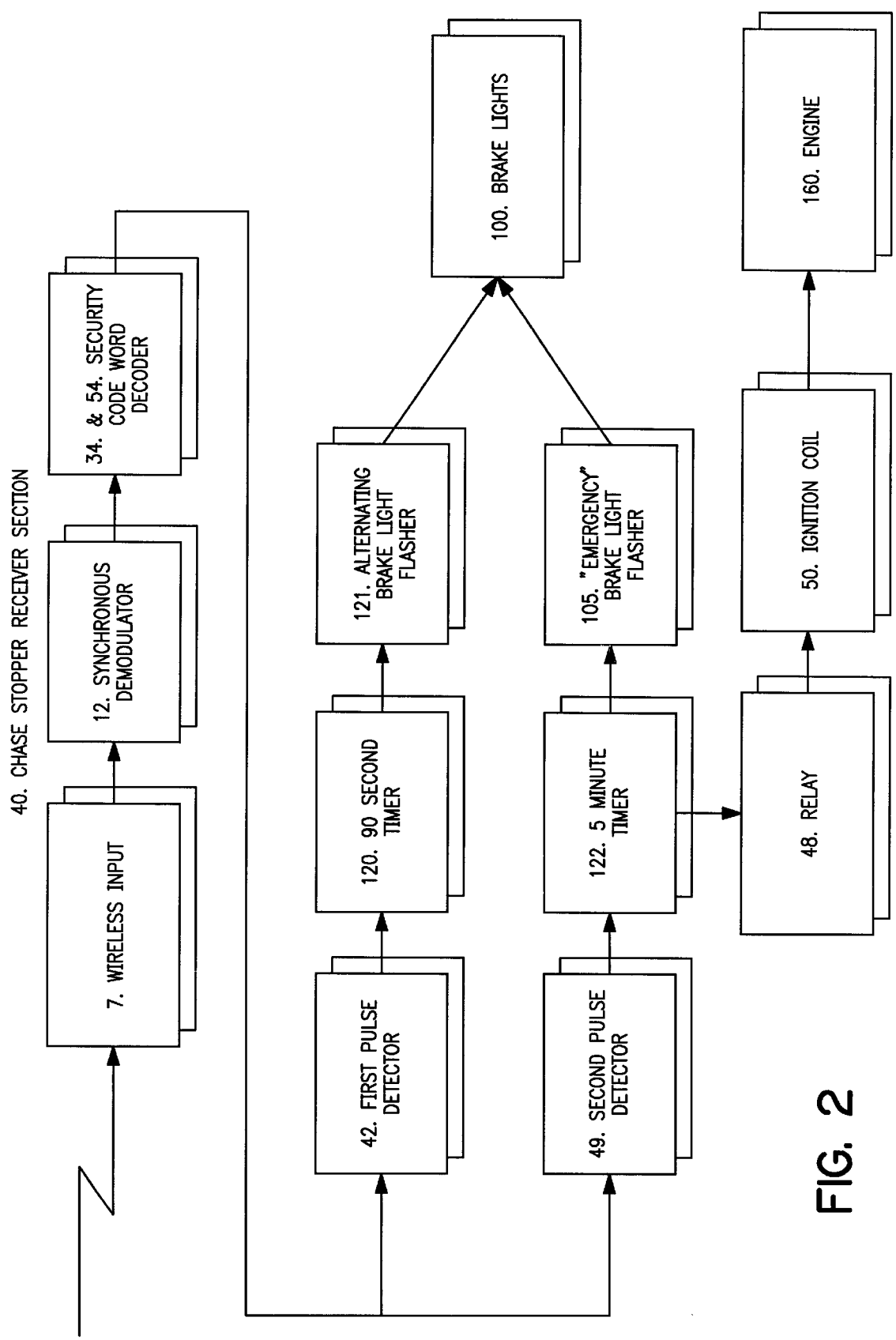

FIGS. 1 and 2 show the operation of the chase stopper. The chase stopper is comprised of two units, the transmitter 2 and the receiver 40. The transmitter 2, small in size (viz., the size of a pack of cigarettes), can be located in any type of law enforcement motor vehicle including, but not limited to, boats, helicopters, motorcycles, planes, or automobiles. It may also be held by law enforcement personnel so long as it maintains an unobstructed line of sight view with the vehicle being pursued. The transmitter 2 consists of a warning button switch 4, a shut down button switch 5, a circuit 8, and a signal emitter 10.

The receiver 40 can be coupled to any motor vehicle. The receiver 40 is constructed of a signal detector 7, a housing 44, a circuit 46, and a relay 48. The signal detector 7 of the receiver can be permanently mounted in any rear-facing position on the vehicle. In at least one embodiment involving infrared light, the signal detector 7 should be placed in a position such that an unobstructed line of sight view with the vehicle operated is maintained by law enforcement personnel. For example, the signal detector 7 may be attached to the rear tail-light (not shown) of a motor vehicle.

The chase stopper has three distinct modes of operation: the normal mode, the warning mode, and the shutdown mode. Each of these modes of operation is explained in turn below.

In the normal mode, the receiver 40 is activated and is waiting to receive a signal from a transmitter 2. Because both the receiver 40 and its operation are hidden from the view of the fleeing suspect, the suspect should be unaware that his vehicle can be stopped by law enforcement personnel.

The warning mode is the second stage of operation and is triggered when the transmitter 2 emits a first signal (the warning enable signal) that is received by the receiver 40. The first signal triggers a first timer 120 in the receiver 40 and also causes the brake lights 100 to flash. If the receiver 40 does not receive a second signal from a transmitter 2, the first timer 120 will time out and stop alternately flashing the brake lights 100 and return the receiver 40 to the normal mode. The first timer 120 may be set for different durations. However, for the purpose of illustration, 90 seconds may be used as the time period in which the brake lights may alternately flash.

The warning mode serves two purposes. First, the brake lights flash providing visual feedback to the law enforcement personnel that the receiver 40 is activated. Second, during a high-speed pursuit, if law enforcement personnel accidentally cause a receiver 40 to enter the warning mode on an innocent bystander's motor vehicle, the law enforcement personnel may wait until the innocent bystander's motor vehicle is passed before sending the second signal to the suspect's motor vehicle. This action avoids inadvertently shutting down the innocent bystander's motor vehicle.

The shut down mode causes the suspect's motor vehicle to stop moving and the brake lights to continue to flash. The shutdown mode can only be triggered if the receiver 40 has received the first signal, tripping this warning mode, and has received a second signal from a transmitter 2. Upon receiving the second signal, a second timer 122 is activated and the power that is typically generated from a generator (or from a battery) is terminated to the suspect's motor vehicle's ignition coil 50. This is achieved by applying power to a relay 48 coupled to the ignition coil 50 of the engine to the suspect motor vehicle which the relay 48 is generally closed, power to the relay 48 causes the relay 48 to open thereby breaking a circuit and shutting off the power to the engine of the suspect's motor vehicle. The suspect's motor vehicle cannot be started as long as the second timer 122 is active. The second timer 122 may be set for different durations. However, for the purpose of illustration, 5 minutes is used.

Additionally, as soon as the second timer 122 has begun counting, the brake lights 100 flash. The chase stopper can keep the suspect's motor vehicle disabled indefinitely by the transmission of additional signals from the transmitter 2 to the receiver 40 attached to the suspect's motor vehicle. If the chase stopper does not receive additional signals, the counter to the second timer 122 will time out and return the chase stopper to the normal mode, allowing the motor vehicle to be started.

Although any kind of electromagnetic or light wave transmitter/receiver combination could be used to construct a chase stopper, a line-of-sight transmitter is preferred since a single motor vehicle in a group of motor vehicles could be disabled without disabling adjacent motor vehicles. Some alternative signals include directional FM, infrared, laser, or radar. The type of transmitter used in these units may be ultimately determined by a commission or a government agency that may mandate its use.

A discrete integrated circuit (IC) is preferred, but there are many ways to build a circuit that may work equally well. For example, the chase stopper may be constructed using: (i) two discrete digital timers or a single multi-purpose digital timer similar to the prototype; (ii) two discrete 555-type timers or similarly functioned chips; (iii) a single RC network with two voltage comparators that are triggered at voltages corresponding to 90 seconds and 5 minutes; (iv) two RC networks with RC time constants corresponding to 90 seconds and 5 minutes with voltage comparators that would trigger at the voltages corresponding to 90 seconds and 5 minutes; (v) two programmable counters in which one programmable counter is hard-wired for 90 seconds, the other programmable counter is hard-wired for 5 minutes; (vi) a single programmable timer and load in its maximum count corresponding to the first and second signals, 90 seconds, and 5 minutes; or, (vii) digital electronics incorporated all of the requisite function into a single chip using traditional integrated circuit techniques.

In an alternative embodiment, it should be noted that a similar shut down operation may occur by coupling the microprocessor to the relay. When the relay is open, power is cut-off to the microprocessor thereby shutting off the engine. A battery or a generator may serve as the power source to the microprocessor.

Figures 1, 3A:
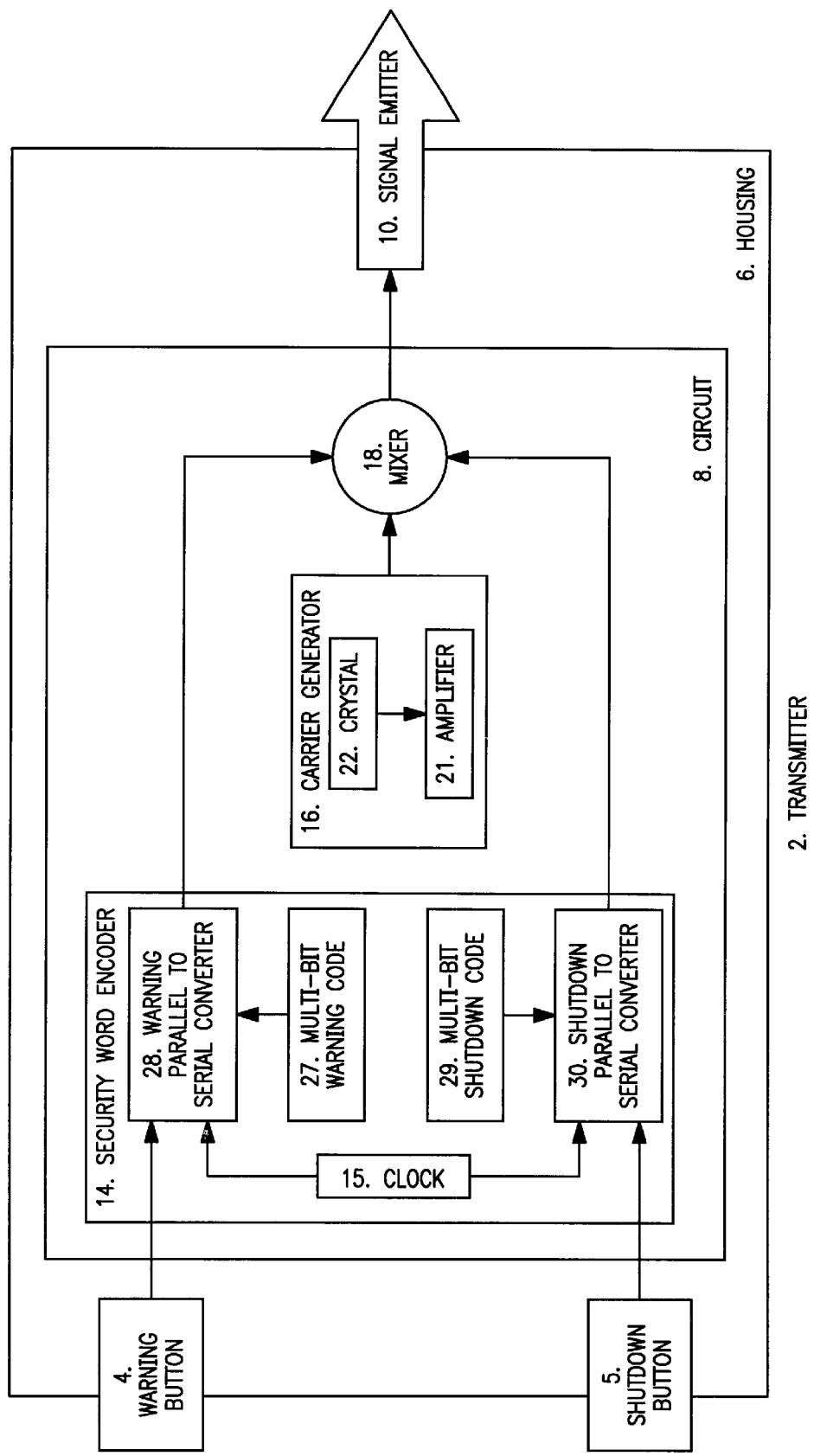
Figures 2, 3A:
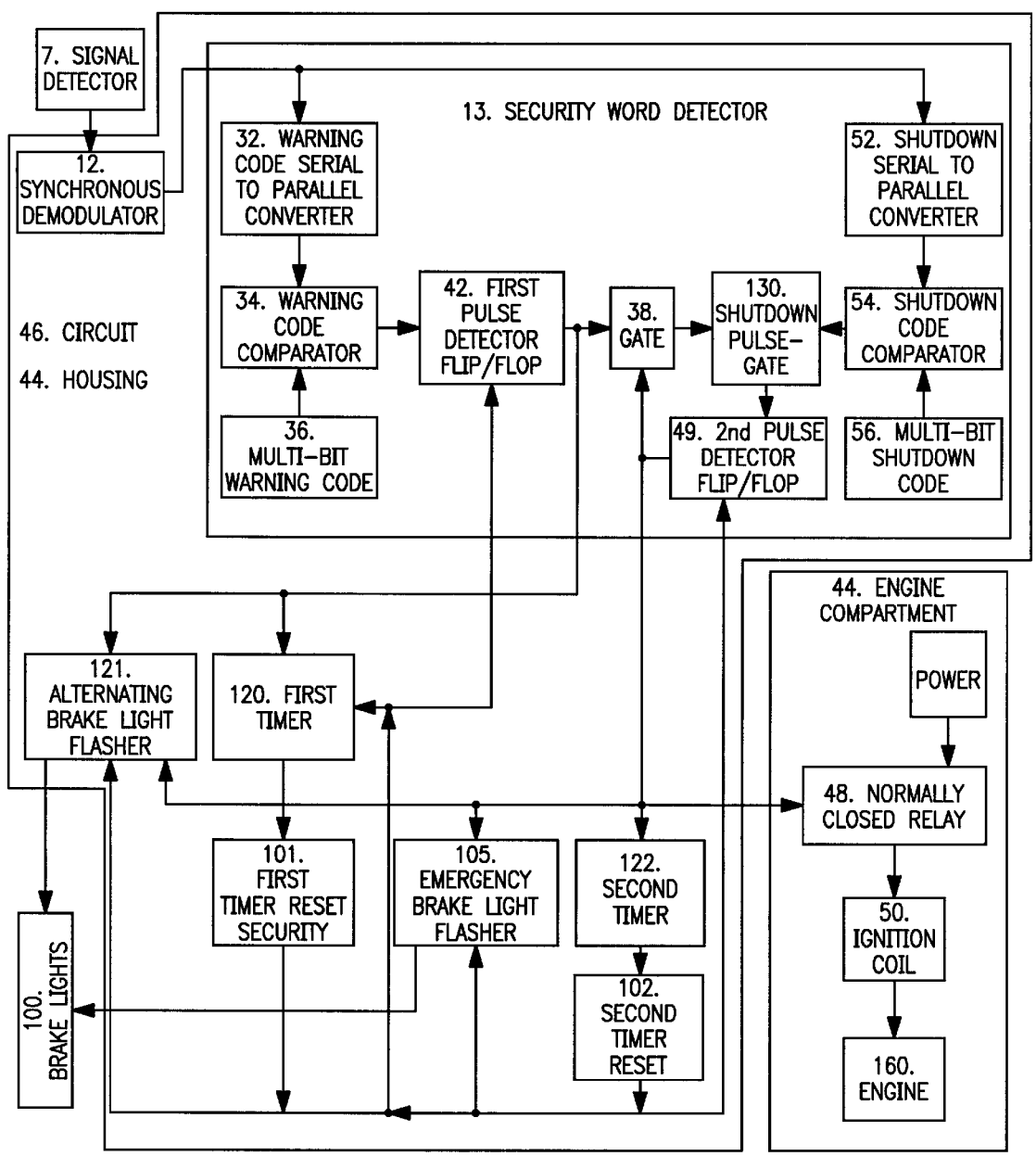

FIGS. 3a and 3b show another embodiment of an operation of a transmitter 2 and receiver 40 that is coupled to a fleeing suspect's motor vehicle. The transmitter 2 in the vehicle operated by law enforcement is activated and is waiting for the law enforcement officer to push the warning button switch 4. The receiver 40 is activated and is attached to the motor vehicle driven by the suspect. This receiver 40 is seeking a signal from the transmitter 2. The receiver 40 is completely hidden from the view of the driver.

When a law enforcement officer pushes the warning button switch 4 of the transmitter 2, a first signal is momentarily supplied to the security word encoder 14 of the transmitter. In this embodiment, the security word encoder 14 consists of a multi-bit parallel to serial converter 28 with a clock 15. When a first signal is sent, the security word encoder 14 acquires a multi-bit warning code 27 that is hard wired to the warning serial to parallel converter 28 of the device and clocks the warning code bits out serially, one bit at a time, to a mixer 18. When power is applied to a carrier generator 16, a carrier wave is produced. By applying power to a crystal 22, it begins to oscillate. These oscillations are amplified by an amplifier 21 and passed to a mixer 18. The mixer 18, a network of voltage divider resistors, combines the serial data provided by the security word encoder 14 and the carrier wave supplied by the carrier generator 16 and sends this signal to signal emitter 10. When the warning button switch 4 is pushed, the first signal is sent to the circuit of the transmitter 2 wherein the warning code of the first signal is converted into a serial data stream and is mixed with a carrier wave. This wave is applied to the signal emitter 10 which causes the warning code to be sent to the receiver 40 coupled to the suspect's motor vehicle.

The receiver 40 detects the incoming signal at the rear-facing signal detector 7. The signal detector 7 passes the first signal to the synchronous demodulator 12. The synchronous demodulator 12 strips away the carrier signal from the serial data stream. The synchronous demodulator 12 then passes the serial data stream containing the multi-bit warning code 27 for the warning mode to the security word detector 13. The security word detector 13 takes the stream of incoming data and converts it from serial to parallel resulting in a parallel data word. A comparator 34 compares this parallel data word to the preprogrammed stored security code word for warning mode. If the two words match, it sends a pulse to the first pulse detector flip/flop 42. The state of the flip/flop output was low until the first signal flipped it to high. The output of this flip/flop is sent to the first timer 120, the alternating brake light flasher 121 and opens the shutdown pulse gate 130 to allow the shutdown pulse to pass through if detected. If the law enforcement personnel do not press the shut down button switch 5 to send the second signal with the shutdown code, the first timer 120 will reach the end of its count. The reset circuitry 101 detects the end count and generates a reset pulse. This pulse resets a 90-second counter (the first timer 120) and resets the first pulse detector flip/flop 42, resets the alternating brake light flasher 121, and resets the gate 38 that allows the shutdown pulse gate to pass the shutdown signal through to the shutdown circuitry. At this point, the circuitry has returned to the normal mode. It should be noted that with additional shutdown signals, the second timer 122 resets each time a pulse passes through the 130 shutdown pulse gate because the signal goes to second pulse detector flip/flop 49 and to the second timer 122.

However, if the law enforcement officer pushes the shut down button switch 5 while the receiver 40 is in the warning mode, the transmitter 2 sends a second signal that is a different data word, the shutdown code. This second code passes from the transmitter 2 to the receiver 40 and then to the security word decoder 52. The security word decoder 52 detects the shutdown code and sends the second signal to a shutdown pulse gate 130. The, shutdown pulse gate 130 is open and passes the shutdown signal to a secondary pulse detector flip/flop 49, and turns it from low to high. This shutdown signal resets the alternating brake light flasher 121 and enables the emergency brake light flasher 105. The shutdown signal also starts a second timer 122. The shutdown signal opens a generally closed relay 48 in the engine. Typically, the relay 48 supplies power to the ignition coil 50. By opening this relay 48, power is terminated from the ignition coil 50 to the engine 160 and the engine stops. This shutdown signal also closes a gate 39 so that 4 the reset signal from the first timer 120 reaching the end of its count does not close the shutdown pulse gate 130. By doing so, the shutdown pulse gate 130 remains open so the law enforcement personnel may continue to send additional signals to keep the suspect's motor vehicle disabled until the suspect can be apprehended. Each time a shut down code is received, it resets the second timer 122 (5-minute duration) and keeps the suspect's motor vehicle in shutdown mode. At the end of 5 minutes, the 5-minute reset signal pulse is produced in the receiver 40. The 5 minute reset signal resets all the circuitry back to the normal mode and the car can be started.

In the preceding detailed description, the invention is described with reference to specific embodiments thereof. It will, however, be evident that various modifications and changes may be made thereto without departing from the broader spirit and scope of the invention as set forth in the claims. The specification and drawings are, accordingly, to be regarded in an illustrative rather than a restrictive sense.

We claim:

1. An apparatus comprising:
   a receiver configured to receive a first signal and a second signal generated by a transmitter;
   the transmitter is configured to emit a first signal and a second signal to the receiver by depressing at least one button on the transmitter;
   the first signal has a first code and the second signal has a second code;
   the first signal causes lights on a motor vehicle to flash a plurality of times when the first code of the first signal matches a first predetermined code in the receiver to allow for a decision making time period;
   a relay coupled to the receiver and an ignition coil to cause an engine to shut down in response to the second code of the second signal when the second code matches a predetermined second code in the receiver, wherein the receiver comprises a circuit which includes a signal detector, a synchronous demodulator, a security code word decoder, a first timer, and a second timer, a brake light controller, wherein the security word decoder is coupled to a synchronous demodulator, the brake light controller, the first timer, the second timer, and to the relay in an engine of a motor vehicle.

2. The apparatus of claim 1, wherein a comparator compares the first code in the first signal to the first predetermined code in the receiver.

3. An apparatus comprising:
   a receiver configured for installation in a motor vehicle and to receive a first signal and a second signal, the first signal having a first code and the second signal having a second code;
   wherein the first signal causes at least one light of the motor vehicle to flash a plurality of times when the first code of the first signal matches a first predetermined code in the receiver to allow for a decision making time period;
   the receiver further configured for coupling to a relay, said relay coupled to an ignition subsystem of the motor vehicle to cause an engine of the motor vehicle to shut down in response to the second code of the second signal when the second code matches a predetermined second code in the receiver;
   wherein the receiver includes a security code word decoder, a first timer, a second timer, and at least one light controller, the security word decoder coupled to the first timer and the second timer, at least one of the first and second timer coupled to the at least one light controller, the second timer for coupling to said relay, said at least one light controller for coupling to at least one light of said motor vehicle.

4. The apparatus of claim 3, wherein said security code word decoded comprises a comparator which compares a first code in the first signal to a first predetermined code in the receiver.

5. An apparatus comprising:
   receiver means for installing in a motor vehicle and receiving a first signal and a second signal, the first signal having a first code and the second signal having a second code;
   wherein the first signal causes at least one light of the motor vehicle to flash a plurality of times when the first code of the first signal matches a first predetermined code in the receiver to allow for a decision making time period;
   the receiver means for coupling to a relay, said relay coupled to an ignition subsystem of the motor vehicle, the receiver means operable to cause an engine of the motor vehicle to shut down in response to the second code of the second signal when the second code matches a predetermined second code in the receiver;
   the receiver means including a security code word decoder, a first timer, a second timer, and a light controller, the security word decoder coupled to the first timer and the second timer, at least one of the first and second timer coupled to at least one light controller, the second timer for coupling to said relay.

6. An system comprising:
   a transmitter configured to emit a first signal and a second signal by depressing at least one button on the transmitter, the first signal having a first code and the second signal having a second code;

a receiver configured for installation in a motor vehicle and to receive the first signal and the second signal;

wherein the first signal causes at least one light of the motor vehicle to flash a plurality of times when the first code of the first signal matches a first predetermined code in the receiver to allow for a decision making time period;

the receiver further configured for coupling to a relay, said relay coupled to an ignition subsystem of the motor vehicle to cause an engine of the motor vehicle to shut down in response to the second code of the second signal when the second code matches a predetermined second code in the receiver;

wherein the receiver includes a security code word decoder, a first timer, a second timer, and at least one light controller, the security word decoder coupled to the first timer and the second timer, at least one of the first and second timer coupled to the at least one light controller, the second timer for coupling to said relay, said at least one light controller for coupling to at least one light of said motor vehicle.

7. The apparatus of claim 6, wherein said security code word decoded comprises a comparator which compares a first code in the first signal to a first predetermined code in the receiver.

* * * * *